Feb. 2, 1971 N. B. BRAYMER 3,560,958

ELECTRICAL SWITCHING SYSTEM

Filed Jan. 30, 1967

INVENTOR
NOEL B. BRAYMER

BY Wilson, Robbins & Anderson
ATTORNEYS

United States Patent Office 3,560,958
Patented Feb. 2, 1971

3,560,958
ELECTRICAL SWITCHING SYSTEM

Noel B. Braymer, Costa Mesa, Calif., assignor to Dana Laboratories, Inc., Irvine, Calif., a corporation of California

Filed Jan. 30, 1967, Ser. No. 612,609
Int. Cl. H03k *13/02*
U.S. Cl. 340—347 2 Claims

ABSTRACT OF THE DISCLOSURE

This application discloses the use of a single transistor of either the NPN or the PNP type interconnected and biased for use as a switch in a diigtal-to-analog converter. A plurality of such transistor switches are used in conjunction with individual logic amplifiers to control the state, "off" or "on," of the transistor switch so as to cause the transistor switch to apply a representative current signal (through variation in gain of each transistor) to a summing junction or to isolate the summing junction from the current source. Where representative currents are from several switches and are summed to develop a composite analog signal, the point of summation is held at "virtual ground" through the use of an "operational amplifier." Each of the transistor switches are operated in the inverted mode, that is, the collector of the transistor is operated as the dominant emitter.

The present system relates to an electrical switching system, and more specifically to such a system which may be effectively employed for translating a group of binary signals into a single representative analog signal.

BACKGROUND OF THE INVENTION

In the use of various electrical apparatus as for control operations, metering systems, data processors and functionally related applications, the need frequently arises for a converter to translate representative signals from one format into another. Specifically, for example, one very common form of information representation involves a plurality of two-state or binary signals, each of which manifests one digit of a binary numerical value. Another common form of information representation simply involves an analog signal which may take the form of a voltage or an electrical current, the magnitude of which represents a numerical quantity or value. As a result of the widespread use of systems utilizing these different types of signals, the need frequently arises for a digital-to-analog converter as well known in the prior art, for translating signals so as to facilitate interconnection of different format systems.

One form of digital-to-analog converter which has been widely used in the past includes sources of several individual analog signals each of which is representative of one binary digit in the code employed. The binary signals are then applied to control switches in the system which supply associated component analog signals to a junction point at which they are summed to develop the equivalent analog signal. In the past, transistor switches have been employed in systems of this type; however, certain difficulties have accompanied the use of these elements. Specifically, a transistor is a somewhat imperfect switch in that when "open," it develops an undesired current and when "closed," it generates an undesired voltage. Furthermore, "closed" transistor switches present a substantial series resistance. Each of these imperfections results in an error in the conversion or translation, which errors in total have generally resulted in the need for optimum transistor type selection and compensating structure in the system.

One of the prior techniques employed to improve a transistor switch involves using two transistors, one of which functions as the series switch while the other is shunted to the common-terminal. Switches of this type have been widely used in digital-to-analog converters wherein component voltages are provided for addition to develop the composite analog signal. Such systems generally are relatively complex and expensive.

This arrangement necessarily imposes a reverse bias at least equal to the reference voltage upon each of the transistors. This voltage may preclude the use of inverted switches, because of the low base-emitter breakdown voltage in most modern diffused transistor types. The switch must be used in the normal, noninverted configuration or must use a transistor type with a large base-emitter voltage capability which is achieved at the expense of other desirable characteristics.

FIELD OF THE INVENTION

In accordance with the present invention, a technique and structural arrangement has been discovered whereby a single transistor may be effectively employed as a switch for use, as in a digital-to-analog converter. Specifically, the switch provides an analog component current, so that representative currents from several switches may be summarized to develop the equivalent composite analog signal. In this regard, an important criterion of the system resides in tne consideration that the point of summation be held at a "virtual ground," which may be accomplished by the use of an "operation amplifier" with feedback, as described in detail below. However, where only the sense (polarity) of the signal is of interest, one need not hold the summation junction at ground. An "operational amplifier" is defined as an amplifier having three terminals, an input terminal, an output terminal, and a terminal common to the input-output terminals, said amplifier having large values of voltage gain, the output voltage as compared to the input voltage. A signal proportional to the output voltage is fed back as a current to the input terminal which is held by negative feedback to (or near) the potential of the common terminal thereby making the input terminal a "virtual ground." Inputs to this amplifier are in the form of currents and the output voltage is proportional to the sum of the currents applied to this input terminal which is commonly called the summing junction.

Another facet of the system hereof resides in the selection of a transistor having certain specific characteristics and operation of the transistor in what has been termed the "inverted mode." That is, the junction of the transistor normally employed as the collector is used as the dominant emitter. The emitter may then be biased in the forward or "on" direction; however, it must not be dominant. In the representative embodiment described in detail below, it is possible to utilize the inverted mode because the reference potential is applied only to the base-collector junction. During the on-off, or off-on transition, the transistor functions as common-collector amplifier, or "emitter follower." In the "off" state, tne base-emitter voltage can be merely sufficient to reduce base-emitter conduction to a very low level. The voltage can be zero, or even slightly in the forward direction. A slight reverse bias may be imposed but only to overcome tolerances in the base drive voltage in the "off" direction.

An essential characteristic of the reference potential, relative to the "virtual" ground is that it must be unipolar and of the polarity (reverse bias) normally applied across the base collector junction. That is, for a NPN switch, the reference potential must be positive relative to tne "virtual ground"; for a PNP switch the reference potential must be negative.

SUMMARY OF THE INVENTION

Accordingly, it is an object of the present invention to provide an improved switching system utilizing a transistor, a plurality of which may be effectively combined with other elements, to provide an economical and accurate digital-to-analog converter.

It is another object of the present invention to provide an improved digital-to-analog converter utilizing single-transistor switches whereby a plurality of individual representative currents are summed to accomplish an analog equivalent of digital inputs.

It is another object of the present invention to provide an improved switching arrangement utilizing a transistor operated in the "inverse mode" whereby ideal switching is more closely approached.

It is another object of the present invention to provide an accurate and economical digital-to-analog converter which may also incorporate means for varying representative signals by a predetermined factor. This potential can be varied over a wide range of magnitude, but must be unipolar. Pseudo bipolar operation can be effected by various means well known to those skilled in the art. The maximum reference voltage approaches the collector-base reverse breakdown voltage. This voltage may be very great, even in a transistor type with a very small base-emitter reverse bias voltage tolerance.

BRIEF DESCRIPTION OF THE DRAWINGS

Additional objects and advantages of the present invention will become apparent from a consideration of the following description taken in conjunction with the accompanying drawings which are presented by way of example only and are not intended as a limitation upon the scope of the present invention as defined in the appended claims, and in which:

DESCRIPTION OF THE PREFERRED EMBODIMENTS

A digital-to-analog converter in accordance with the present invention comprises at least one binary switch which is essentially a single transistor operated in either one of two states wherein it is either "closed" to pass a representative current, or "open" to effectively isolate a summing junction from the source of the representative current. As disclosed herein, the transistor switches are controlled to be "open" or "closed" by the individual logical amplifier and the representative currents are established for each transistor switch by a precision resistor and a source of reference potential from which the signal current is supplied.

Figure 1:
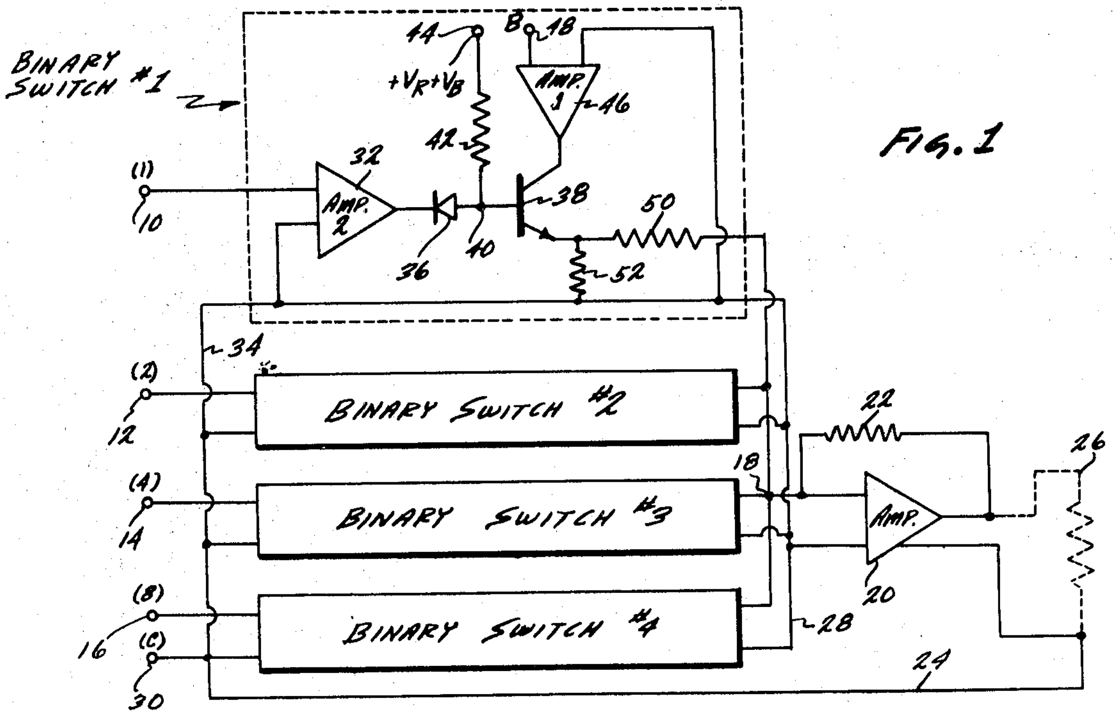
FIG. 1 is a schematic circuit diagram, a portion of which is in block form, illustarting a converter in accordance with the present invention.

Considering the system hereof in greater detail, reference will now be made to FIG. 1 showing blocks representative of binary switches #1, #2, #3, and #4, all of which are generally similar and of which the binary switch #1 is shown in circuit detail. Each of tne binary switches is connected to a terminal adapted to receive the indivdual binary digit signals of representative value. Specifically, binary switch #1 receives a binary input at a terminal 10 which signal is representative of the least significant digit, e.g. decimal "one" in the exemplary code format. In a similar manner, terminals 12, 14 and 16 are connected respectively to the binary switches #2, #3 and #4, and respectively receive binary signals representative of decimal values, "two," "four," and "eight."

Upon receiving an activating binary signal the switches #1, #2, #3 and #4 close to deliver a proportionate representative current to a junction point 18. That is, the binary switch #1 carries an analog current representative of "one" while the switches #2, #3 and #4 respectively are capable of providing component analog currents representative of decimal values "two," "four," and "eight" in the analog scale adopted.

The junction point 18 receiving the component analog signals is the input to an operational amplifier 20 in which the individual currents are summed into the representative aggregate analog signal. The amplifier 20 may incorporate internal feedback paths, however, an external feedback path does pass, as shown through a resistor 22 for preserving a "virtual ground" at the input to the amplifier 20, e.g. the junction point 18.

The output from the amplifier 20, which is referenced to the potential of a common conductor 24, is provided to a load, indicated in phantom as a resistor 26. The resistor 26 is connected to the common bus 24 as is the network 28 and the common input terminal 30 to which the input binary signals are referenced.

Considering the structural details of the similar binary switches, binary switch #1 will be explained as representative thereof. The input terminal 10 is connected to an amplifier 32 which is referenced to the common binary input through a conductor 34. The output of the amplifier 32 is connected through a unidirectional switch such as a transistor or preferably (as shown) a diode 36 to the base electrode of a transistor 38. The junction point 40 between the base of the transistor 38 and the anode of the diode 36 is connected through a resistor 42 to a terminal 44 adapted to receive a positive potential as considered below.

The collector electrode of the transistor 38 is connected to the output of an amplifier 46 which is referenced to the common conductor 34 and provides transistor operating potential from a power supply B which is connected at the terminal 48 thereof. The amplifier 46 (as provided in each of the binary switches shown) may accomplish varying amounts of amplification in each switch. That is, the operating potential at the collector may differ between the binary switches to accomplish the desired representative current analog.

The emitter electrode of the transistor 38 is connected through a precision resistor 50 to the junction point 18. Furthermore, a shunt resistor 52 is provided between the emitter electrode and the common conductor 34. The precision resistor 50 limits the current flow from the emitter electrode of the transistor 38 to the desired representative component analog. As indicated above, the amplifier 46 may also be adjusted in this regard so that either criteria may be varied to accomplish the desired current.

In the operation of the individual switches, when the received binary signal applied at the terminal 10 indicates "zero," the amplifier 32 provides a low signal level to the cathode of the diode 36. Specifically, the output of the amplifier 32 may be at a negative level of one or two volts. As a result, current flows from the terminal 44 through the resistor 42 and the diode 36 with the result that the junction point 40 is held low, maintaining the transistor 38 cut off. Specifically, the potential at the junction point 40 may be a volt or two negative, while the collector electrode is at the operating level (B plus the amplification of amplifier 46) and the emitter electrode is substantially at the potential of the common. As a result, the base emitter junction of the transistor is effectively cut off and the control path between the collector and the emitter electrodes is "open." During this state of operation, a small leakage current may flow from the emitter electrode, a portion of which is shunted through the resistor 52 to avoid the cumulative development of significant error signals.

If the binary signal applied at the terminal 10 shifts to indicate a "one" digit, the output from the amplifier 32 becomes high with the result that the diode 36 is reversed biased to cut off. As a result, the junction point approaches the potential applied at the terminal 44, which is at the level of the reference potential $+V_R$ plus the bias potential across the transistor. The potential applied at the terminal 44 is therefore designated $+V_R+V_B$.

With the base electrode of the transistor 38 driven by the potential $+V_R+V_B$, the "closed-switch" state occurs. That is, the transistor operates essentially as an emitter-follower in saturated conduction so that the voltage appearing at the emitter electrode of the transistor is the same, or very nearly the same as the voltage at the collector electrode. For example, in certain transistors the difference has been determined to be approximately 260 microvolts. During this stage of operation the transistor 38 is in the "inverse mode," in that the collector electrode is actually injecting to a greater extent than the emitter electrode and therefore is in fact the dominant emitter of the two electrodes.

The flow of current through the transistor 38 from the collector electrode to the emitter electrode is limited by the precision resistor 50 so that the current flow is representative (in the anlog scale) of the digital value manifest at the input terminal 10. Specifically, for example, if the digital value represents a decimal "one" then the current flow through the resistor 50 would be scaled to represent "one" in the adopted analog scale.

The current flow from the binary switch #1 is applied to the amplifier 20 along with similar outputs from other binary switches all of which are combined into the composite or aggregate representative analog signal.

In the operation of the system as shown in FIG. 1, the combined currents which total the aggregate analog signal may be utilized in that form or alternatively converted to a representative analog voltage and the amplifier 20 designed to "sense" the polarity, or its change thereof however, insofar as the present system is concerned, the preliminary summation of currents is basic.

Another consideration of the present system resides in the selection of the transistor 38. The transistor 38 may have a high alpha inverse characteristic when it functions as a "closed switch." This feature attains a low dynamic series resistance between the collector and emitter electrodes of the transistor so that the resistance does not change significantly with current fluctuations which change would result in an error. Furthermore, the transistor may also have a high alpha normal characteristic to preserve the voltage between the collector and emitter electrodes relatively low during the "open switch" period. Additionally, the transistor 38 should be operable to maintain the current flow between the base and emitter electrodes at a relatively low value during intervals when the switch is "open." Of course, although the illustrative embodiment utilizes an "NPN" transistor, it is to be understood that a PNP transistor can readily be employed by reversing the polarities and the current flow directions in the system.

The amplifier 32 must limit the degree to which the base of the transistor 38 is negatively driven when an NPN transistor is used. That is, the output of the transistor 32 should be limited to a value which does not exceed the voltage breakdown rating of the transistor, approximately one volt below common for an NPN transistor.

Figure 2:
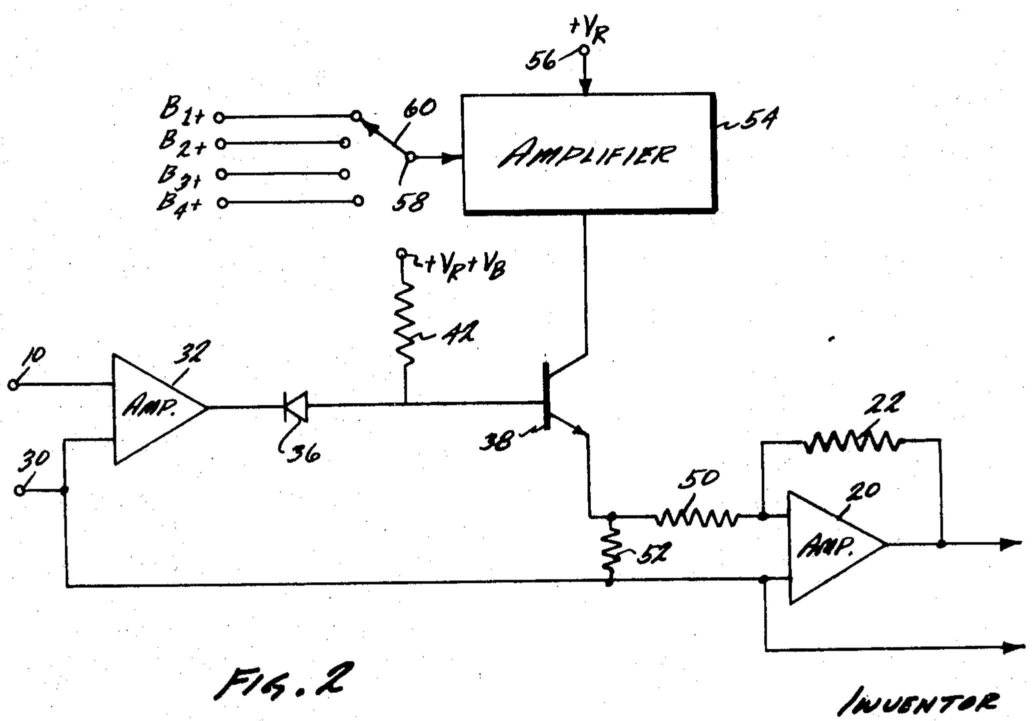
FIG. 2 is a schematic circuit diagram illustrating an alternative embodiment which may be employed as a portion of the system of FIG. 1.

In some situations, the need occurs for a converter of the type generally described above which incorporates apparatus for modifying the analog signal in accordance with some predetermined factor. For example, it may be desirable to perform a translation of binary digital signals into a representative analog signal which has been multiplied by a predetermined value. With some modification in the binary switch circuit, a system of such capability can be provided. An exemplary form of the modified switch circuit is shown in FIG. 2 and will now be considered in detail. The elements of FIG. 2 which have been previously described, bear similar reference numerals to like elements in FIG. 1.

The basic operation of the system of FIG. 2 is similar to that of the binary switch #1 described with reference to FIG. 1. That is, the input to the amplifier 32 determines whether or not the diode 36 is conductive or cut off. During the conductive state of the diode 36, the base of the transistor 38 is held low, interrupting the current path from the collector electrode to the emitter electrode. During this state the base-emitter voltage of the transistor 38 is held low. When the amplifier 32 receives a digital signal it reverse biases the diode 36 and the base of the transistor 38 moves to a higher potential level causing the transistor to conduct with the result that a current path is provided from the collector electrode of the transistor to the emitter electrode, which current path is completed through the precision resistor 50 to the amplifier 20. The distinction of the system of FIG. 2 lies in the several inputs to the amplifier 54. The amplifier 54 is driven by the reference potential $+V_R$, which is applied at an input terminal 56. An input terminal 58 to the amplifier 54 then may be connected to any of a plurality of inputs through a multi-contact switch 60. The fixed contacts of the switch 60 are adapted to receive different levels of potential (B1, B2, B3, B4) which modify the reference voltage $+V_R$. In this manner, the amplifier may provide variations of the voltage to the transistor 58 for a multiplied output. Of course, the multi-contact switch 60 may be replaced by a wide variety of different signal sources either fixed or continuously varying. Thus, for example, the analog signal provided from the system may be modulated or multiplied in accordance with a desired objective.

There has thus been described a digital-to-analog converter which may be economically constructed and accurately operated as disclosed with reference to the illustrative embodiments. In this regard, however, it will be apparent to those skilled in the art that a wide variety of variations, modifications may be made with respect with the system as disclosed; therefore, as indicated, the scope hereof is not to be limited by the illustrative embodiment but rather to be interpreted in accordance with the claims set forth below.

What is claimed is:

1. A digital-to-analog converter for translating a plurality of digital signals into a representative analog signal, comprising:

a plurality of switching circuits, each for controlling the flow of electrical current from a source of potential, and each of said switching circuits including, a single transistor having a relatively low dynamic resistance between a collector electrode and an emitter electrode, a common terminal, means connecting the collector electrode of said transistor to said source of potential, means connecting the emitter electrode of said transistor to said common terminal, control signal means for each switching circuit, controlled by one of said digital signals, said control means including a diode being connected to receive said one of said digital signals and to the base of said transistor, for providing a two-state "off-on" signal thereto, said "off" signal level being substantially equal to a potential at said common terminal and said switching circuit further including a circuit for supplying current to said diode whereby said "on" signal level is held at a voltage level that is at least equal said potential plus the bias potential across the base-collector junction of said transistor whereby said transistor operates in an inverse mode;

said digital-to-analog converter further comprising means for summing said electrical currents from each of said plurality of switching circuits to thereby provide said analog signal.

2. A system according to claim 1 wherein said source of potential comprises a plurality of amplifiers including means for varying the amplitude of an electrical signal therefrom while maintaining constant polarity.

(References on following page)

References Cited

UNITED STATES PATENTS

| | | | |
|---|---|---|---|
| 2,956,272 | 10/1960 | Cohler et al. | 340—347 |
| 2,993,202 | 7/1961 | Halonen | 340—347 |
| 3,019,426 | 1/1962 | Gilbert | 340—347 |
| 3,223,992 | 12/1965 | Bentley | 340—347 |
| 3,315,254 | 4/1967 | Rockey | 340—347 |
| 3,328,792 | 6/1967 | Stone et al. | 340—347 |
| 3,426,345 | 2/1969 | Kase | 340—347 |

MAYNARD R. WILBUR, Primary Examiner

J. GLASSMAN, Assistant Examiner